United States Patent
Porzio et al.

(10) Patent No.: US 11,768,629 B2
(45) Date of Patent: Sep. 26, 2023

(54) TECHNIQUES FOR MEMORY SYSTEM CONFIGURATION USING QUEUE REFILL TIME

(71) Applicant: Micron Technology, Inc., Boise, ID (US)

(72) Inventors: Luca Porzio, Casalnuovo (IT); Nadav Grosz, Broomfield, CO (US); Roberto Izzi, Caserta (IT); Jonathan S. Parry, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/243,321

(22) Filed: Apr. 28, 2021

(65) Prior Publication Data

US 2022/0350532 A1 Nov. 3, 2022

(51) Int. Cl.
*G06F 3/06* (2006.01)
*G06F 1/08* (2006.01)

(52) U.S. Cl.
CPC .............. *G06F 3/0659* (2013.01); *G06F 1/08* (2013.01); *G06F 3/0604* (2013.01); *G06F 3/0653* (2013.01); *G06F 3/0673* (2013.01)

(58) Field of Classification Search
CPC ........ G06F 3/0659; G06F 1/08; G06F 3/0604; G06F 3/0653; G06F 3/0673
USPC .......................................................... 711/154
See application file for complete search history.

(56) References Cited

U.S. PATENT DOCUMENTS

| | | | | |
|---|---|---|---|---|
| 6,128,672 A * | 10/2000 | Lindsley | ............... | G06F 9/4812 710/48 |
| 8,966,130 B2 * | 2/2015 | Sarcone | ................... | G06F 3/067 710/5 |
| 11,288,014 B2 * | 3/2022 | Shin | ..................... | G06F 13/1642 |
| 2007/0168789 A1 * | 7/2007 | Udell | ............. | G01R 31/318371 714/724 |
| 2015/0046605 A1 * | 2/2015 | Barrell | ................... | G06F 3/0689 710/5 |
| 2022/0093194 A1 * | 3/2022 | Lee | ..................... | G11C 16/3404 |
| 2022/0121501 A1 * | 4/2022 | Shveidel | ............... | G06F 9/5083 |

FOREIGN PATENT DOCUMENTS

| | | | | | |
|---|---|---|---|---|---|
| CN | 112187563 A | * | 1/2021 | .......... | G06F 16/183 |
| JP | 2007104677 A | * | 4/2007 | | |
| WO | WO-9514337 A1 | * | 5/1995 | ............ | H04J 3/0632 |

* cited by examiner

*Primary Examiner* — Charles Rones
*Assistant Examiner* — Alexander Vinnitsky
(74) *Attorney, Agent, or Firm* — Holland & Hart LLP

(57) ABSTRACT

Methods, systems, and devices supporting techniques for memory system configuration using a queue refill time are described. A memory system may receive a command from a host system and may add the command to a command queue including a set of commands to be executed by the memory system. The memory system may determine a queue refill time of the command queue using measurements for at least one queue tag of the command queue and may adjust at least one resource of the command queue in response to the determined queue refill time. In some examples, the memory system may reallocate processing or memory resources previously allocated to the command queue, deactivate processing or memory resources previously allocated to the command queue, adjust a threshold queue depth for the command queue, or any combination thereof, among other options, based on the queue refill time.

20 Claims, 6 Drawing Sheets

TECHNIQUES FOR MEMORY SYSTEM CONFIGURATION USING QUEUE REFILL TIME

FIELD OF TECHNOLOGY

The following relates generally to one or more systems for memory and more specifically to techniques for memory system configuration using a queue refill time.

BACKGROUND

Memory devices are widely used to store information in various electronic devices such as computers, user devices, cameras, digital displays, and the like. Information is stored by programing memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

DETAILED DESCRIPTION

Figure 1:
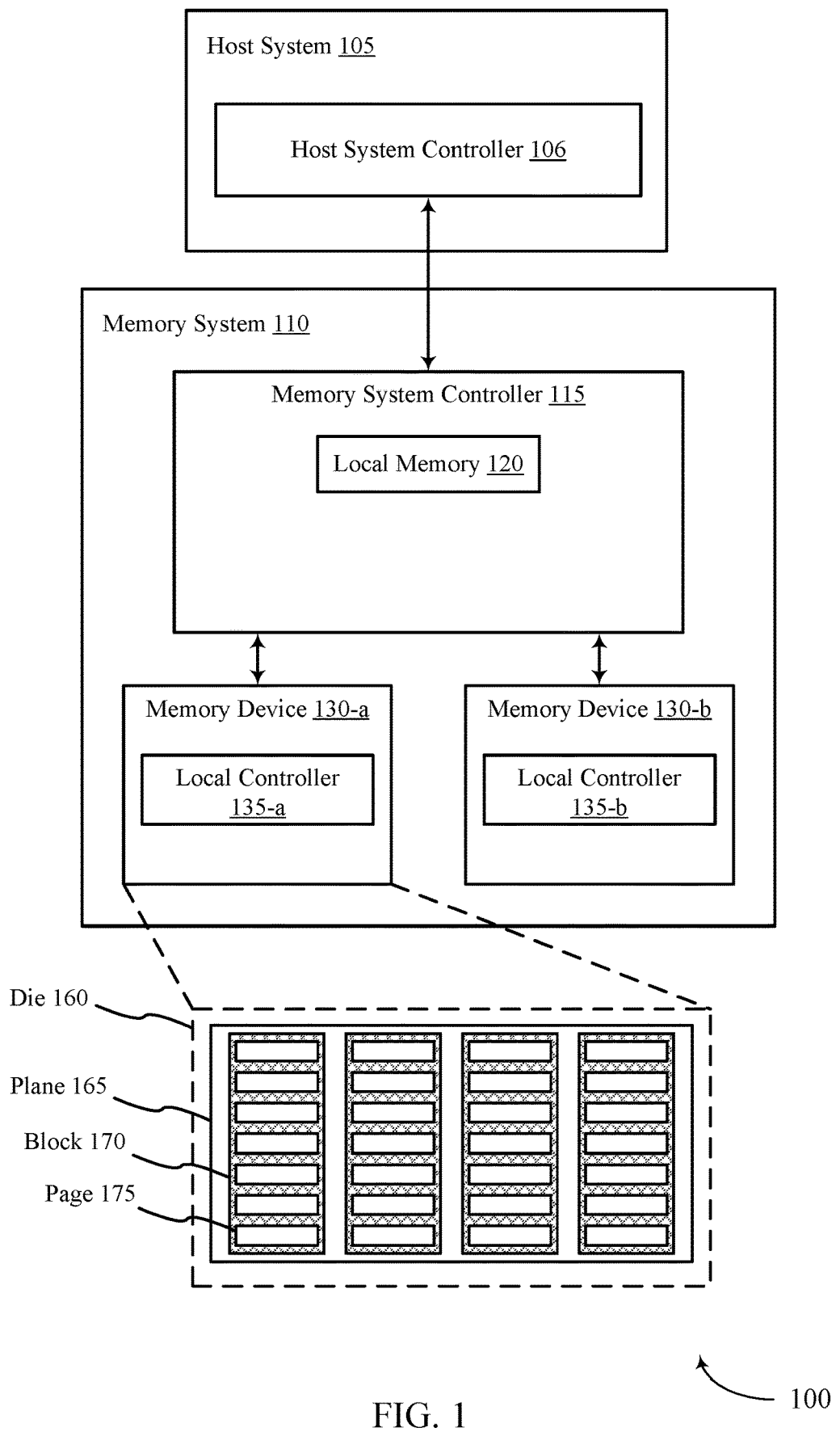
FIGS. 1 and 2 illustrate examples of systems that supports techniques for memory system configuration using a queue refill time in accordance with examples as disclosed herein.

A memory system in electronic communication with a host system may receive one or more commands from the host system. For example, the memory system may receive a read command to read a logic state of one or more memory cells of a memory device of the memory system or a write command to write a logic state to one or more memory cells of the memory device. Some memory systems may be capable of executing—or storing for execution—more than one command at a time. In such examples, the memory system may be configured with a command queue. The command queue may store a list of commands to be executed or currently being executed (or both) by the memory system. Each command of the command queue may be associated with a respective queue tag (e.g., a queue entry of the list of commands), where the quantity of queue tags in the command queue may be known as the queue depth. If the memory system finishes executing a command of a given queue tag, the memory system may remove the command from the command queue. The host system may send a new command to the memory system, and the memory system may refill the given queue tag with the new command. The time to refill a queue tag with a new command may be known as a refill time, and the command queue may have a queue refill time associated with the refill time(s) for one or more queue tags for the command queue. The memory system may allocate some quantity of resources for the command queue (e.g., some quantity of processing power and memory resources). However, during the queue refill time for the command queue, some of the allocated resources may go unused due to the potentially inaccurate allocation of the quantity of resources for the command queue, effectively lowering the efficiency of the memory system.

To efficiently utilize the resources of the memory system, the memory system may reallocate command queue resources in response to a measured queue refill time. In some examples, the memory system may perform an operation, such as running a test, for example a benchmark test, to measure the queue refill time of the command queue. During the test, such as benchmark test, the command queue may be filled to a specific queue depth (e.g., queue depth of 1, 8, or 32). The memory system may measure the queue refill time as the time between the completion of a command and the reinsertion of a new command at the same queue tag from the benchmark test. Once the memory system determines the queue refill time, the memory system may reallocate resources (e.g., processing resources, memory resources, or both, other resources) for the command queue. For example, the memory system may perform other tasks using the command queue resources during the queue refill time or the memory system may decrease the processing power by some amount during the queue refill time. The memory system may decrease the processing power by decreasing one or more clock speeds related to the command queue or decreasing a voltage supplied to a processor during a duration of the queue refill time. In some other examples, the memory system may not utilize the full queue depth and may adjust the queue depth in response to the queue refill time. In such examples, the memory system may adjust command queue resources to match the adjusted queue depth and may reuse the additional resources for other processes. Additionally or alternatively, the memory system may adjust memory device parallelism, the types of commands used to access the memory devices of the memory system, or an amount of memory cells allocated for the command queue. Using the methods described herein, the memory system may improve system efficiency by aligning resource usage with memory system capabilities in terms of the queue refill time, the queue depth, and the command queue resources.

Figure 2:
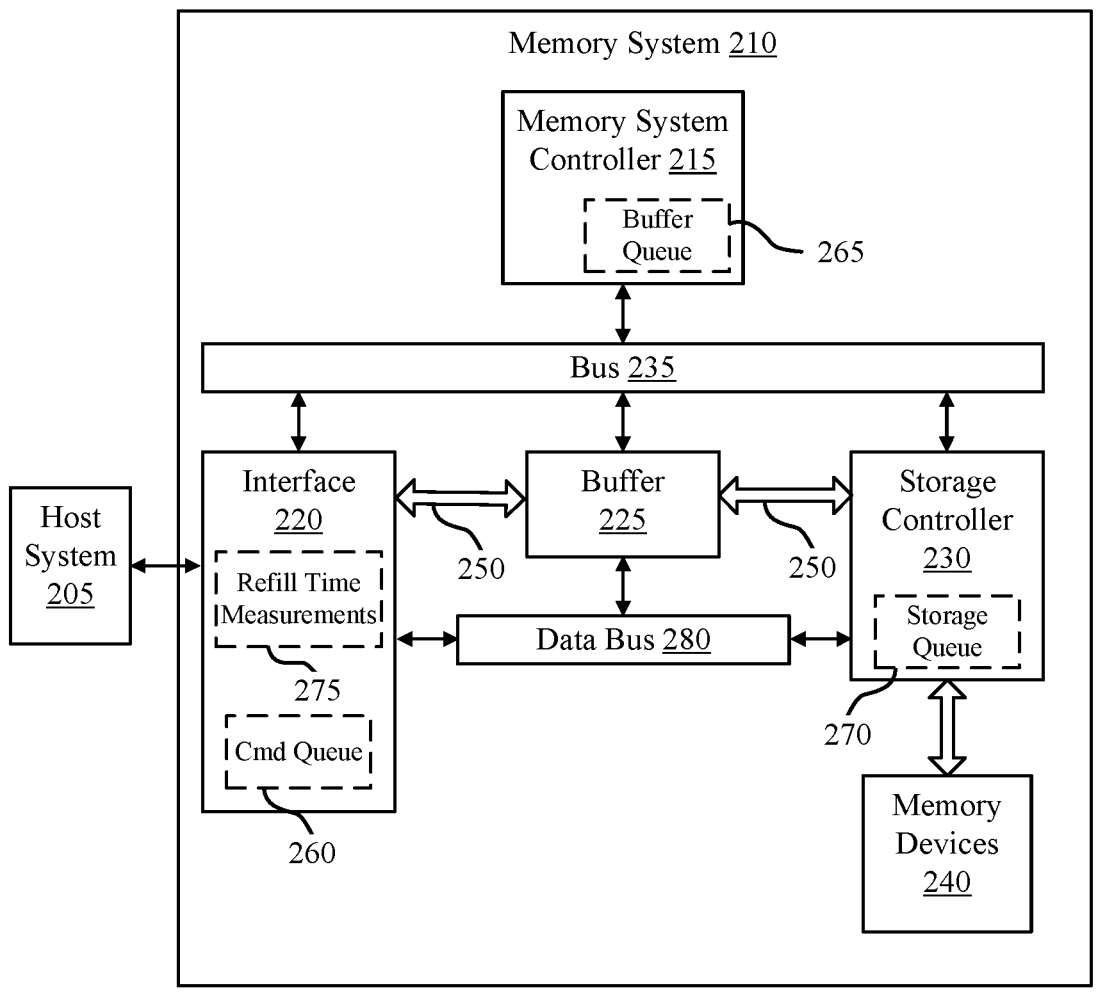

Features of the disclosure are initially described in the context of systems and devices with reference to FIGS. 1 and 2. Additional features of the disclosure are described in the context of a command queue configuration with reference to FIG. 3 and a process flow with reference to FIG. 4. These and other features of the disclosure are further illustrated by and described in the context of an apparatus diagram and flowchart that relate to techniques for memory system configuration using a queue refill time with reference to FIGS. 5 and 6.

FIG. 1 illustrates an example of a system 100 that supports techniques for memory system configuration using a queue refill time in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices, and in some cases may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may in some cases be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-*a* and 130-*b* are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hardcoded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may in some cases instead be performed by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, performing concurrent operations in different planes 165 may be subject to one or more restrictions, such as identical operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may in some cases not be updated until the entire block 170 that includes the page 175 has been erased.

The system 100 may include any quantity of non-transitory computer readable media that support techniques for memory system configuration using a queue refill time. For example, the host system 105, the memory system controller 115, or a memory device 130 may include or otherwise may access one or more non-transitory computer readable media storing instructions (e.g., firmware) for performing the functions ascribed herein to the host system 105, memory system controller 115, or memory device 130. For example, such instructions, if executed by the host system 105 (e.g., by the host system controller 106), by the memory system controller 115, or by a memory device 130 (e.g., by a local controller 135), may cause the host system 105, memory system controller 115, or memory device 130 to perform one or more associated functions as described herein.

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is an MNAND system.

In some examples, the memory system 110 may receive multiple commands from the host system 105 at a given time and may store the multiple commands in a command queue. A command queue may be an example of a list of in-flight commands (e.g., commands being executed or to be executed by the memory system 110). Each command of the command queue may be associated with a respective queue tag and the quantity of commands present in the command queue at a given time may be referred to as the queue depth. Once the memory system 110 executes a command stored at a given queue tag, the command at the given tag may be removed from the command queue and a new command may be added to the command queue at the given queue tag. In some examples, the system 100 may take time to refill the given queue tag with the new command. During this time, at least a portion of the resources allocated for the command queue may go unused. For example, a subset of resources related to processing the command queue may go unused, resulting in power consumption at the memory system 110 with no corresponding performance gain.

As described herein, the memory system 110 may measure a queue refill time for the command queue and may adjust resources of the command queue in response to the queue refill time. In some examples, the memory system 110 may measure the refill time for one or more of the queue tags of the command queue. That is, the memory system 110 may measure the time between completing execution of a command of a specific queue tag and inserting a new command at the specific queue tag. In some examples, the memory system 110 may average the refill times of the one or more queue tags and set the average as the queue refill time. In another example, the memory system 110 may determine the fastest refill time of the one or more queue tags and may set the fastest refill time as the queue refill time. In some examples, the queue refill time may be updated to reflect changes to the memory system 110 or the host system 105. Once the memory system 110 determines the queue refill time, the memory system 110 may adjust resources for the command queue in response to the queue refill time. For example, the memory system may adjust processing resources for the command queue in response to the queue refill time. Additionally or alternatively, the memory system 110 may adjust a queue depth of the command queue in response to the queue refill time and in turn may adjust resources for the command queue to support the adjusted queue depth. The memory system 110 may adjust the parallelism of memory devices 130, a type of read command used to read data from a memory device 130, memory resources allocated to the command queue, or any combination thereof in response to the adjusted queue depth. The methods described herein may allow the memory system 110 to satisfy a threshold performance without excess power consumption.

FIG. 2 illustrates an example of a system 200 that supports techniques for memory system configuration using a queue refill time in accordance with examples as disclosed herein. The system 200 may be an example of a system 100 as described with reference to FIG. 1 or aspects thereof. The system 200 may include a memory system 210 configured to store data received from the host system 205 and to send data to the host system 205, if requested by the host system 205 using access commands (e.g., read commands or write commands). The system 200 may implement aspects of the system 100 as described with reference to FIG. 1. For example, the memory system 210 and the host system 205 may be examples of the memory system 110 and the host system 105, respectively.

The memory system 210 may include memory devices 240 to store data transferred between the memory system 210 and the host system 205, e.g., in response to receiving access commands from the host system 205, as described herein. The memory devices 240 may include one or more memory devices as described with reference to FIG. 1. For example, the memory devices 240 may include NAND memory, PCM, self-selecting memory, 3D cross point, other chalcogenide-based memories, FERAM, MRAM, NOR (e.g., NOR flash) memory, STT-MRAM, CBRAM, RRAM, or OxRAM.

The memory system 210 may include a storage controller 230 for controlling the passing of data directly to and from the memory devices 240, e.g., for storing data, retrieving data, and determining memory locations in which to store data and from which to retrieve data. The storage controller 230 may communicate with memory devices 240 directly or via a bus (not shown) using a protocol specific to each type of memory device 240. In some cases, a single storage controller 230 may be used to control multiple memory devices 240 of the same or different types. In some cases, the memory system 210 may include multiple storage controllers 230, e.g., a different storage controller 230 for each type of memory device 240. In some cases, a storage controller 230 may implement aspects of a local controller 135 as described with reference to FIG. 1.

The memory system 210 may additionally include an interface 220 for communication with the host system 205 and a buffer 225 for temporary storage of data being transferred between the host system 205 and the memory devices 240. The interface 220, buffer 225, and storage controller 230 may be for translating data between the host system 205 and the memory devices 240, e.g., as shown by a data path 250, and may be collectively referred to as data path components.

Using the buffer 225 to temporarily store data during transfers may allow data to be buffered as commands are being processed, thereby reducing latency between commands and allowing arbitrary data sizes associated with commands. This may also allow bursts of commands to be handled, and the buffered data may be stored or transmitted (or both) once a burst has stopped. The buffer 225 may include relatively fast memory (e.g., some types of volatile memory, such as SRAM or DRAM) or hardware accelerators or both to allow fast storage and retrieval of data to and from the buffer 225. The buffer 225 may include data path switching components for bi-directional data transfer between the buffer 225 and other components.

The temporary storage of data within a buffer 225 may refer to the storage of data in the buffer 225 during the execution of access commands. That is, upon completion of an access command, the associated data may no longer be maintained in the buffer 225 (e.g., may be overwritten with data for additional access commands). In addition, the buffer 225 may be a non-cache buffer. That is, data may not be read directly from the buffer 225 by the host system 205. For example, read commands may be added to a queue without an operation to match the address to addresses already in the buffer 225 (e.g., without a cache address match or lookup operation).

The memory system 210 may additionally include a memory system controller 215 for executing the commands received from the host system 205 and controlling the data path components in the moving of the data. The memory system controller 215 may be an example of the memory system controller 115 as described with reference to FIG. 1. A bus 235 may be used to communicate between the system components.

In some cases, one or more queues (e.g., a command queue 260, a buffer queue 265, and a storage queue 270) may be used to control the processing of the access commands and the movement of the corresponding data. This may be beneficial, e.g., if more than one access command from the host system 205 is processed concurrently by the memory system 210. The command queue 260, buffer queue 265, and storage queue 270 are depicted at the interface 220, memory system controller 215, and storage controller 230, respectively, as examples of a possible implementation. However, queues, if used, may be positioned anywhere within the memory system 210.

Data transferred between the host system 205 and the memory devices 240 may take a different path in the memory system 210 than non-data information (e.g., commands, status information). For example, the system components in the memory system 210 may communicate with each other using a bus 235, while the data may use the data path 250 through the data path components instead of the bus 235. The memory system controller 215 may control how and if data is transferred between the host system 205 and the memory devices 240 by communicating with the data path components over the bus 235 (e.g., using a protocol specific to the memory system 210). Additionally or alternatively, the memory system 210 may include a data bus 280. The data bus 280 may support, or be an example of, a data path 250. The data bus 280 may allow for the transfer of data between a subset of system components in the memory system 210. For example, the data bus 280 may be connected to the buffer 225, the interface 220, the storage controller 230, or some combination of these or another subset of components and may allow the buffer 225, the interface 220, the storage controller 230, or some combination of these or other components to exchange data.

If a host system 205 transmits access commands to the memory system 210, the commands may be received by the interface 220, e.g., according to a protocol (e.g., a UFS protocol or an eMMC protocol). Thus, the interface 220 may be considered a front end of the memory system 210. Upon receipt of each access command, the interface 220 may communicate the command to the memory system controller 215, e.g., via the bus 235. In some cases, each command may be added to a command queue 260 by the interface 220 to communicate the command to the memory system controller 215.

The memory system controller 215 may determine whether an access command has been received according to the communication from the interface 220. In some cases, the memory system controller 215 may determine that the access command has been received by retrieving the command from the command queue 260. The command may be removed from the command queue 260 after it has been retrieved therefrom, e.g., by the memory system controller 215. In some cases, the memory system controller 215 may cause the interface 220, e.g., via the bus 235, to remove the command from the command queue 260.

Upon the determination that an access command has been received, the memory system controller 215 may execute the access command. For a read command, this may mean obtaining data from the memory devices 240 and transmitting the data to the host system 205. For a write command, this may mean receiving data from the host system 205 and moving the data to the memory devices 240.

In either case, the memory system controller 215 may use the buffer 225 for, among other things, temporary storage of the data being received from or sent to the host system 205. The buffer 225 may be considered a middle end of the memory system 210. In some cases, buffer address management (e.g., pointers to address locations in the buffer 225) may be performed by hardware (e.g., dedicated circuits) in the interface 220, buffer 225, or storage controller 230.

To process a write command received from the host system 205, the memory system controller 215 may first determine if the buffer 225 has sufficient available space to store the data associated with the command. For example, the memory system controller 215 may determine, e.g., via firmware (e.g., controller firmware), an amount of space within the buffer 225 that may be available to store data associated with the write command.

In some cases, a buffer queue 265 may be used to control a flow of commands associated with data stored in the buffer 225, including write commands. The buffer queue 265 may include the access commands associated with data currently stored in the buffer 225. In some cases, the commands in the command queue 260 may be moved to the buffer queue 265 by the memory system controller 215 and may remain in the buffer queue 265 while the associated data is stored in the buffer 225. In some cases, each command in the buffer queue 265 may be associated with an address at the buffer 225. That is, pointers may be maintained that indicate where in the buffer 225 the data associated with each command is stored. Using the buffer queue 265, multiple access commands may be received sequentially from the host system 205 and at least portions of the access commands may be processed concurrently.

If the buffer 225 has sufficient space to store the write data, the memory system controller 215 may cause the interface 220 to transmit an indication of availability to the host system 205 (e.g., a "ready to transfer" indication), e.g., according to a protocol (e.g., a UFS protocol or an eMMC protocol). As the interface 220 subsequently receives from the host system 205 the data associated with the write command, the interface 220 may transfer the data to the buffer 225 for temporary storage using the data path 250. In some cases, the interface 220 may obtain from the buffer 225 or buffer queue 265 the location within the buffer 225 to store the data. The interface 220 may indicate to the memory system controller 215, e.g., via the bus 235, if the data transfer to the buffer 225 has been completed.

After the write data has been stored in the buffer 225 by the interface 220, the data may be transferred out of the buffer 225 and stored in a memory device 240. This may be done using the storage controller 230. For example, the memory system controller 215 may cause the storage controller 230 to retrieve the data out of the buffer 225 using the data path 250 and transfer the data to a memory device 240. The storage controller 230 may be considered a back end of the memory system 210. The storage controller 230 may indicate to the memory system controller 215, e.g., via the bus 235, that the data transfer to a memory device of the memory devices 240 has been completed.

In some cases, a storage queue 270 may be used to aid with the transfer of write data. For example, the memory system controller 215 may push (e.g., via the bus 235) write commands from the buffer queue 265 to the storage queue 270 for processing. The storage queue 270 may include entries for each access command. In some examples, the storage queue 270 may additionally include a buffer pointer (e.g., an address) that may indicate where in the buffer 225 the data associated with the command is stored and a storage pointer (e.g., an address) that may indicate the location in the memory devices 240 associated with the data. In some cases, the storage controller 230 may obtain from the buffer 225, buffer queue 265, or storage queue 270 the location within the buffer 225 from which to obtain the data. The storage controller 230 may manage the locations within the memory devices 240 to store the data (e.g., performing wear-leveling, garbage collection, and the like). The entries may be added to the storage queue 270, e.g., by the memory system controller 215. The entries may be removed from the storage queue 270, e.g., by the storage controller 230 or memory system controller 215 upon completion of the transfer of the data.

To process a read command received from the host system 205, the memory system controller 215 may again first determine if the buffer 225 has sufficient available space to store the data associated with the command. For example, the memory system controller 215 may determine, e.g., via firmware (e.g., controller firmware), an amount of space within the buffer 225 that may be available to store data associated with the read command.

In some cases, the buffer queue 265 may be used to aid with buffer storage of data associated with read commands in a similar manner as discussed above with respect to write commands. For example, if the buffer 225 has sufficient space to store the read data, the memory system controller 215 may cause the storage controller 230 to retrieve the data associated with the read command from a memory device 240 and store the data in the buffer 225 for temporary storage using the data path 250. The storage controller 230 may indicate to the memory system controller 215, e.g., via the bus 235, that the data transfer to the buffer 225 has been completed.

In some cases, the storage queue 270 may be used to aid with the transfer of read data. For example, the memory system controller 215 may push the read command to the storage queue 270 for processing. In some cases, the storage controller 230 may obtain from the buffer 225 or storage queue 270 the location within the memory devices 240 from which to retrieve the data. In some cases, the storage controller 230 may obtain from the buffer queue 265 the location within the buffer 225 to store the data. In some cases, the storage controller 230 may obtain from the storage queue 270 the location within the buffer 225 to store the data. In some cases, the memory system controller 215 may move the command processed by the storage queue 270 back to the command queue 260.

After the data has been stored in the buffer 225 by the storage controller 230, the data may be transferred out of the buffer 225 and sent to the host system 205. For example, the memory system controller 215 may cause the interface 220 to retrieve the data out of the buffer 225 using the data path 250 and transmit the data to the host system 205, e.g., according to a protocol (e.g., a UFS protocol or an eMMC protocol). For example, the interface 220 may process the command from the command queue 260 and may indicate to the memory system controller 215, e.g., via the bus 235, that the data transmission to the host system 205 has been completed.

The memory system controller 215 may execute received commands according to an order (e.g., a first-in, first-out order, according to the order of the command queue 260). For each command, the memory system controller 215 may cause data corresponding to the command to be moved into and out of the buffer 225, as discussed above. As the data is moved into and stored within the buffer 225, the command may remain in the buffer queue 265. A command may be removed from the buffer queue 265, e.g., by the memory system controller 215, if the processing of the command has been completed (e.g., if data corresponding to the access command has been transferred out of the buffer 225). If a command is removed from the buffer queue 265, the address previously storing the data associated with that command may be available to store data associated with a new command.

The memory system controller 215 may additionally be configured for operations associated with the memory devices 240. For example, the memory system controller 215 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., LBAs) associated with commands from the host system 205 and physical addresses (e.g., physical block addresses) associated with memory cells within the memory devices 240. That is, the host system 205 may issue commands indicating one or more LBAs and the memory system controller 215 may identify one or more physical block addresses indicated by the LBAs. In some cases, one or more contiguous LBAs may correspond to noncontiguous physical block addresses. In some cases, the storage controller 230 may be configured to perform one or more of the above operations in conjunction with or instead of the memory system controller 215. In some cases, the memory system controller 215 may perform the functions of the storage controller 230 and the storage controller 230 may be omitted.

As described herein, the memory system 210 may adjust resources for the command queue 260 according to a queue refill time of the command queue 260. The memory system 210 may accept multiple commands at a time from the host system 205 and may push the multiple commands into the command queue 260. Each command of the command queue 260 may correspond to a respective queue tag, and a quantity of commands in the command queue 260 at a given time may be referred to as the queue depth. In some examples, a threshold queue depth for the memory system 210 may be 32. That is, the memory system 210 may allocate memory resources to the command queue 260 such that the quantity of commands stored at the command queue 260 may not exceed 32.

In some examples, the memory system 210 may determine a queue refill time for the command queue 260 by performing a benchmark test. A benchmark test may be used to determine the threshold performance of the memory system 210 at a specific queue depth (e.g., at queue depth 1, 8, 32, or some other queue depth). During the benchmark test, the host system 205 may send multiple commands (e.g., read commands for a random read benchmark, write commands for a random write benchmark test, or some other set of commands) to the memory system 210 to fill up the command queue 260 to the specific queue depth.

After the command queue 260 is full (e.g., to the specific queue depth), the memory system 210 may measure a refill time for one or more queue tags of the command queue. The refill time may measure a time for the interface 220 to insert a new command at a given queue tag after the command previously stored at the given queue tag is executed by the memory system 210. In some examples, the memory system 210 may average the refill times for one or more queue tags and set the queue refill time for the command queue 260 to the average value. In some other examples, the memory system 210 may set the queue refill time for the command queue 260 as the fastest refill time of the measured refill times for the one or more queue tags. In some examples, the memory system 210 may measure the refill times of the one or more queue tags using one or more timers (or one or more clocks). In some examples, the one or more timers may be included at the interface 220 and each queue tag of the one or more queue tags may be associated with a timer (e.g., a same timer or different timers). A timer of a given queue tag may start upon receiving a completion signal indicating that the memory system 210 has executed the command of the given queue tag (e.g., from the memory system controller 215) and stop after a new command is inserted at the given queue tag. Alternatively, the refill times may be calculated using stored timestamps (e.g., a timestamp indicating removal of a command from the command queue 260 at a given queue tag and a timestamp indicating insertion of a command to the command queue 260 at the given queue tag). In some examples, refill time measurements 275 (e.g., measured refill times of the one or more queue tags, the queue refill time for the command queue 260, or both) may be stored by the memory system 210, for example, at the interface 220, the memory system controller 215, one or more memory devices 240, or some combination thereof. Similarly, the command queue 260 may be stored at the interface 220, the memory system controller 215, or another component of the memory system 210 (e.g., in a cache, such as an SRAM cache).

In some examples, the memory system 210 may update the command queue 260 over time. For example, the memory system 210 may perform a second benchmark test and determine a second queue refill time. If the second queue refill time differs from the queue refill time, the memory system 210 may update the queue refill time to reflect the second queue refill time (e.g., in the refill time measurements 275).

After the memory system 210 determines the queue refill time for the command queue 260, the memory system 210 may adjust one or more resources for the command queue 260. In some examples, the memory system 210 may adjust processing resources for the command queue 260 in response to the queue refill time. For example, the memory system 210 may reallocate a portion of the processing resources associated with the command queue 260 to other tasks for the duration of the queue refill time. In some examples, the memory system 210 may reallocate processing resources to execution of a queue tag different from the queue tag being refilled. In another example, the memory system 210 may decrease a quantity of processing resources allocated for the command queue during the queue refill time. For example, the memory system 210 may decrease (or gate) one or more clock speeds related to the command queue 260 for one or more components (e.g., a CPU, an internal system bus, a low density parity check (LDPC) engine, or an open NAND flash interface (ONFI)) or decrease a voltage supplied to a processor (e.g., the CPU) for the duration of the queue refill time. In some examples, the quantity for which the clock speed or voltage may be decreased may be scaled according to the queue refill time. That is, the faster the queue refill time, the less the clock speed and the voltage may decrease.

In some examples, the memory system 210 may adjust the queue depth of the command queue 260 in response to the queue refill time, and the memory system 210 may correspondingly adjust resources for the command queue 260 according to the adjusted queue depth. In some examples, the memory system 210 may not consistently reach the queue depth as specified by the benchmark test or a threshold queue depth (e.g., a maximum queue depth of 32) for the command queue 260. For example, the memory system 210 may execute commands of the command queue 260 as the interface 220 is filling up the command queue 260. As an example, the specific queue depth for the benchmark test may be 32, but the command queue 260 may commonly fail to reach a queue depth less than 32. For example, while the resources allocated for the command queue 260 support a threshold queue depth of 32, in actual execution the memory system 210 may load the command queue 260 with commands up to a different threshold queue depth (e.g., an actual operating maximum queue depth of 16). In such an example, the memory system 210 may reduce the threshold queue depth (e.g., the maximum queue depth) for the command queue 260. For example, the memory system 210 may reduce the threshold queue depth from a first threshold queue depth (e.g., the threshold queue depth of 32) to a threshold queue depth of less than 32 (e.g., a threshold queue depth of 16). In some examples, the memory system 210 may predict the threshold queue depth of the command queue 260 according to the benchmark test—or more specifically, the measured queue refill time—and may adjust the threshold queue depth to the predicted threshold queue depth.

After the memory system 210 adjusts the threshold queue depth of the command queue 260, the memory system 210 may adjust resources for the command queue 260 to match the adjusted threshold queue depth. In some examples, the memory system 210 may adjust the parallelism of the memory devices 240 to match the adjusted threshold queue depth. That is, the memory system 210 may switch on or off one or more memory device 240 for handling access commands of the command queue 260 to support the adjusted threshold queue depth. In some examples, the memory system 210 may adjust the threshold queue depth from a first queue depth to a second queue depth, where the first queue depth is greater than the second queue depth. In such an example, the memory system 210 may switch off one or more memory devices 240 (or, otherwise, deactivate one or more connections to one or more memory devices 240). The quantity of the memory devices 240 that may be switched on or off may depend on the difference between the first queue depth and the second queue depth. In some examples, if the memory system 210 includes multiple processors (e.g., CPUs) operating in parallel, the memory system 210 may similarly adjust the parallelism of the processors in response to the adjusted threshold queue depth (e.g., deactivating one or more processors in response to decreasing the threshold queue depth for the command queue 260).

In some examples, the read algorithms used to access the memory devices 240 may be changed to support the adjusted threshold queue depth. That is, the memory system 210 may adjust the amount of data that is read from the memory device 240 for a given read command. For a queue depth below a threshold, the memory system 210 may utilize cache read (e.g., sensing and retrieving 1 to 4 pages of data), and for a queue depth below a different threshold the memory system 210 may utilize a snap read (sensing and retrieving up to 4 kilobytes (KB) of data). In some examples, the memory system 210 may adjust memory resources for the command queue 260 to support the adjusted threshold queue depth. For example, the memory system 210 may adjust the cache size (e.g., SRAM cache size) allocated to the memory system 210. The command queue 260 may be stored in the cache, and the memory system 210 may decrease the cache size if the threshold queue depth decreases. Alternatively, the memory system 210 may reallocate the cache (e.g., resources initially allocated to the cache or cache management) to service other operations not associated with host data management.

In some examples, the memory system 210 may store a lookup table including queue refill times and associated adjustments for the queue refill times (e.g., resource adjustments). The memory system 210 may store the lookup table at the interface 220, the memory system controller 215, or one or more memory devices 240. The lookup table may include a set of queue refill times (e.g., ranges of queue refill times) and each queue refill of the set of queue refill times may include an indication of how to adjust a clock speed of the processor, a voltage of the processor, a threshold queue depth of the command queue 260, parallelism of the memory devices 240, parallelism of processors, type of read commands for accessing the memory devices 240, the cache size of the memory system 210, or some combination thereof. If the memory system 210 determines the queue refill time, the memory system 210 may compare the queue refill time to the queue refill times of the lookup table and may adjust the resources for the command queue 260 accordingly. By adjusting resources for the command queue 260 in response to the measured queue refill time, the memory system 210 may increase the performance of the memory system 210 in terms of efficiency and power consumption. Additionally, if the queue refill time dynamically changes, the memory system 210 may determine an updated queue refill time and may correspondingly update a resource adjustment for the command queue 260, supporting on-the-fly updates to queue resource management in response to changes to command queue 260 usage.

Figure 3:
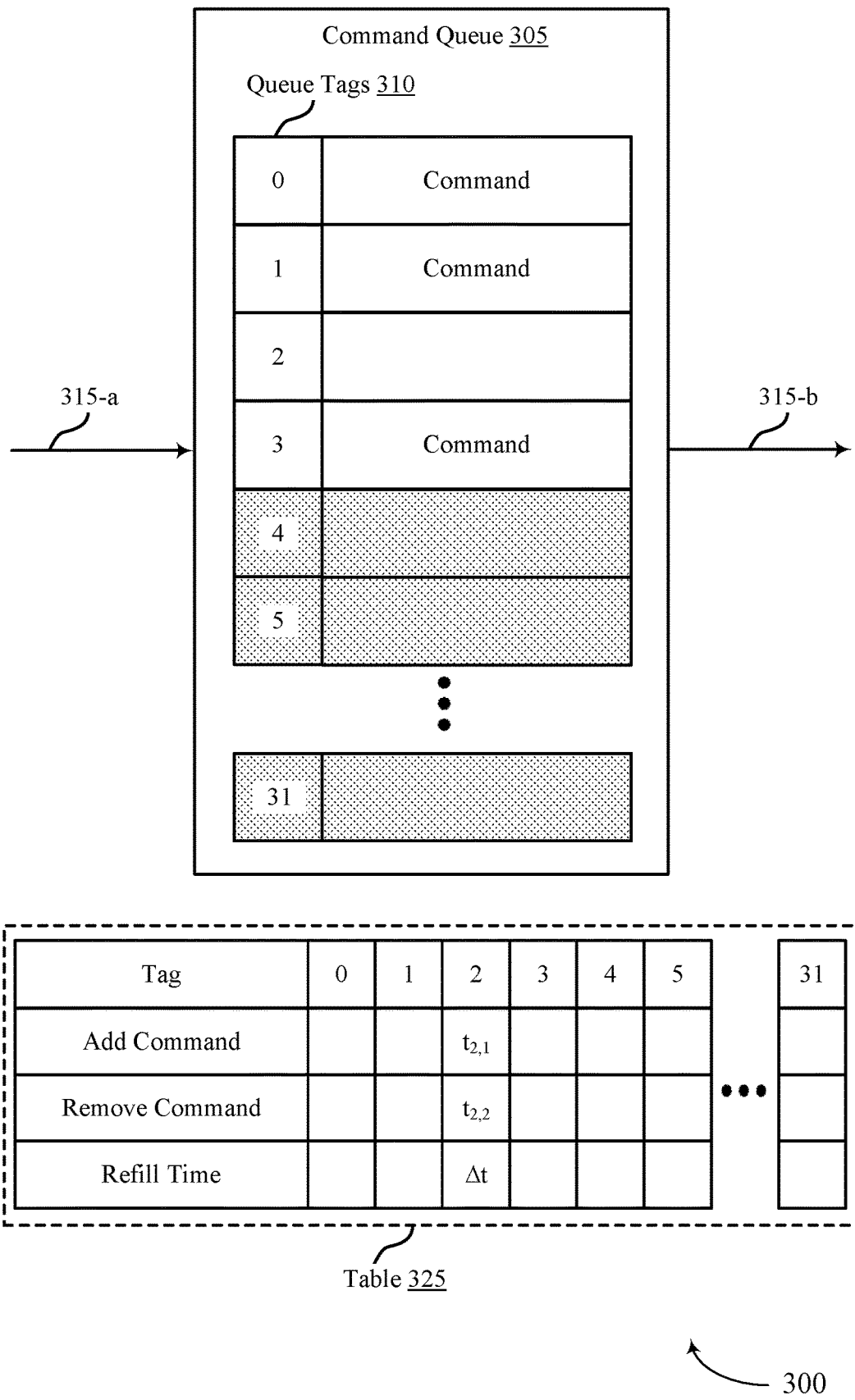
FIG. 3 illustrates an example of a command queue configuration that supports techniques for memory system configuration using a queue refill time in accordance with examples as disclosed herein.

FIG. 3 illustrates an example of a command queue configuration 300 that supports techniques for memory system configuration using a queue refill time in accordance with examples as disclosed herein. In some examples, the command queue configuration 300 may implement features of a system 100 and a system 200. For example, the command queue 305 and the table 325 may be an example of the command queue 260 and the refill time measurements 275 as described with reference to FIG. 2. In some examples, the command queue 305 may be located at an interface between a memory system and a host system. The interface may be coupled with the host system via connection 315-a and the interface may be coupled with the memory system or a component of the memory system via connection 315-b. In some cases, the command queue 305 may be stored at a cache (e.g., an SRAM cache) or a memory system controller of the memory system. In some examples, the command queue 305 may include multiple queue tags 310 (e.g., 32 queue tags).

As described with reference to FIG. 2, the memory system may undergo a benchmark test to determine a queue refill time for the command queue 305. During the benchmark test, the interface may receive multiple commands from the host system via connection 315-a to load into the command queue 305. For example, the memory system may receive multiple commands and may add each command to the command queue 305 at a specific queue tag 310 (e.g., queue tags 0, 1, 2, 3, 4, 5, and up to 31 for a threshold queue depth of 32).

In some examples, the memory system may execute a command stored at the command queue 305. For example, the memory system may execute the command at queue tag 2. Upon execution of the command, the memory system may remove the command from the queue tag 310 and record a first timestamp associated with removing the command. For example, the memory system may remove the command from the command queue 305 at the queue tag 2 and record, in the table 325, a timestamp associated with removing the command from the command queue 305 at the queue tag 2 (e.g., $t_{2,2}$). After the command is removed from the command queue 305, the memory system may add a new command to the command queue 305 at the same queue tag 310 and may record a second timestamp associated with adding the command to the command queue 305. For example, the memory system may add the new command to the command queue 305 at queue tag 2 and record a timestamp associated with adding the new command to the command queue 305 at queue tag 2 (e.g., $t_{2,1}$). After the memory system determines the first timestamp and the second timestamp for a given queue tag 310, the memory system or the host system may determine the refill time of the given queue tag 310 by calculating a difference between the second timestamp and the first timestamp ($\Delta t$).

In some examples, the memory system may store one or all of the first timestamp, the second timestamp, and the refill time in a table 325. The table 325 may be an example of the refill time measurements 275 as described with reference to FIG. 2. The table 325 may include a quantity of columns, where each column corresponds to a different queue tag 310 of the command queue 305, such that the memory system may record and store the first timestamp, the second timestamp, and the refill time for each queue tag 310 of the command queue 305 (e.g., 32 columns for a threshold queue depth of 32). In some example, the memory system may perform a second benchmark test and update the values of the first timestamps, the second timestamps, and the refill times of the table 325 as a result of the second benchmark test. In some examples, the table 325 may be stored according to a different format than illustrated in FIG. 3.

In some examples, the memory system or the host system may determine a queue refill time for command queue 305 based on (e.g., calculated using) the values stored in the table 325. For example, the memory system may select a refill time of the table 325 with the lowest value and set it as the queue refill time for the command queue 305. In some examples, the memory system or the host system may average the refill times of the table 325 and set the average as the queue refill time for the command queue 305. Using the queue refill time, the memory system may adjust resources for the command queue 305. For example, the memory system may adjust internal clock speeds during the queue refill time or reallocate processing resources to other tasks during the queue refill time as discussed with reference to FIG. 2.

Additionally or alternatively, the memory system may adjust the queue depth (e.g., a threshold queue depth) of the command queue 305 in response to the queue refill time. During the benchmark test, the memory system may add commands to the command queue 305 such that a specific queue depth is reached (e.g., a queue depth of 32 is reached). But, in some cases, as the memory system is in the process of filling the command queue 305, commands may be executed by the memory system. For example, the memory system may fill the command queue 305 up to queue tag 3, and the memory system may execute the command stored at queue tag 2. If the command queue 305 has queue tags 0 to 3 refilled with incoming commands and does not use queue tags 4 to 31, the threshold queue depth of 32 for the command queue 305 may be excessive (e.g., corresponding to a relatively inefficient allocation of resources to the command queue 305). As such, the measured queue refill time may not reflect the queue refill time of the threshold queue depth but a queue refill time of a queue depth less than the threshold queue depth. Using this information, the memory system may predict a threshold queue depth (e.g., an actual operating threshold queue depth) and may adjust the threshold queue depth to the predicted queue depth. For example, the memory system may predict a queue depth of 4 and adjust the threshold queue depth of the command queue 305 to 4 (from 32). That is, the command queue 305 may include queue tags 0, 1, 2, and 3.

After the memory system adjusts the threshold queue depth, the memory system may also adjust resources to align with the adjusted threshold queue depth. For example, the memory system may deactivate or reallocate a portion of the processing resources for the command queue 305. The memory system may deactivate processing resources associated with queue tags 4 through 31 or the memory system may reallocate the processing resources to other tasks (e.g., executing commands of queue tags 0, 1, 2, and 3). Additionally or alternatively, the memory system may adjust the parallelism of memory devices of the memory system, parallelism of processors of the memory system, read commands for accessing the memory devices, or a cache size of the memory system as described with reference to FIG. 2. By adjusting the threshold queue depth in response to the queue refill time and aligning resources of the command queue 305 to the adjusted threshold queue depth, the memory system may increase performance and decrease power consumption.

Figure 4:
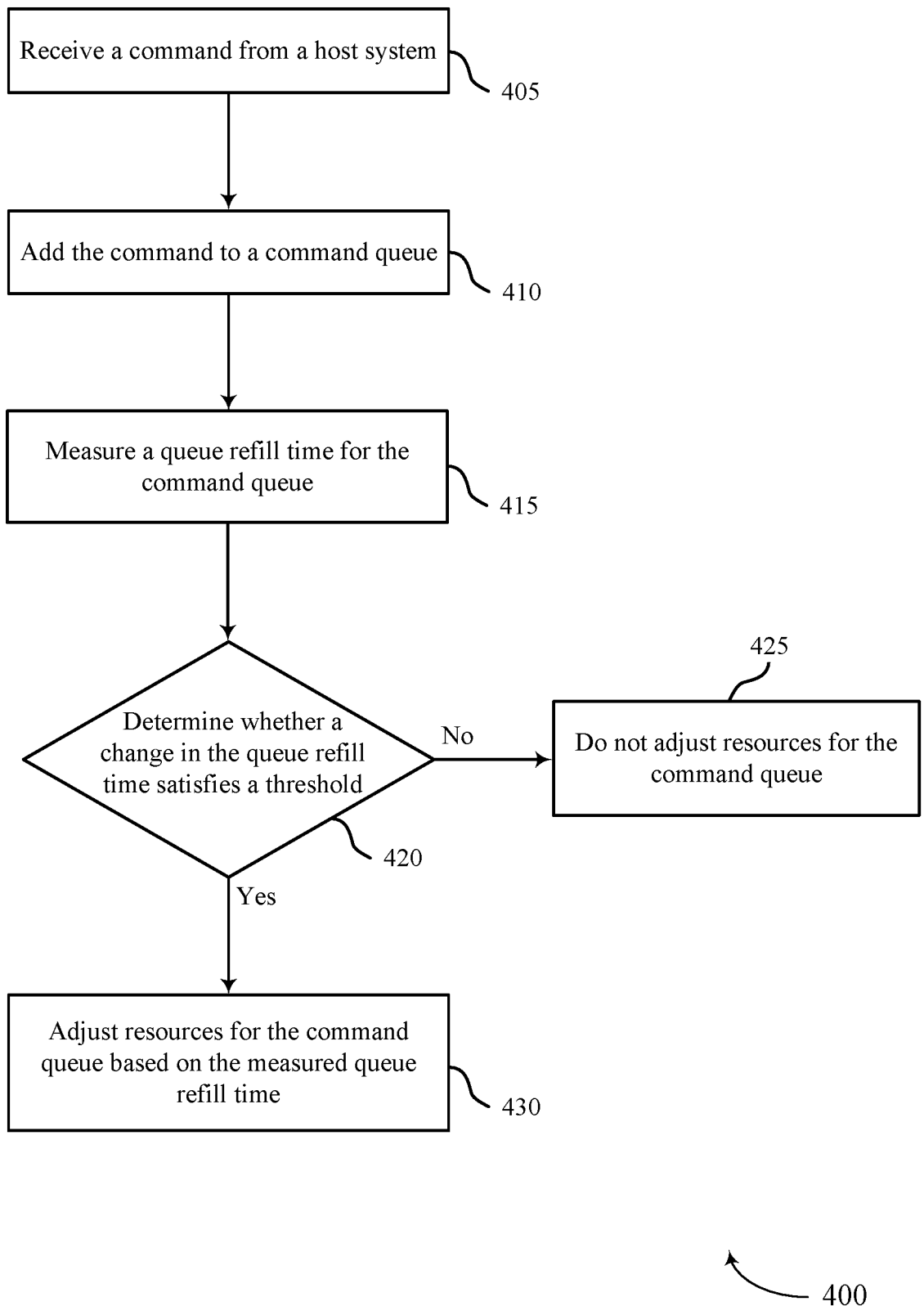
FIG. 4 illustrates an example of a process flow that supports techniques for memory system configuration using a queue refill time in accordance with examples as disclosed herein.

FIG. 4 illustrates an example of a process flow 400 that supports techniques for memory system configuration using a queue refill time in accordance with examples as disclosed herein. The process flow 400 may be performed by a memory system (or one or more components thereof), such as the memory system 110 or the memory system 210 as described with reference to FIGS. 1 and 2. The memory system may determine a queue refill time for a command queue, such as a command queue 260 or a command queue 305 as described with reference to FIGS. 2 and 3, and may adjust resources in response to the determined queue refill time. In some cases, alternative examples of the following may be implemented, where some operations may be performed in a different order than described or are not performed at all. Additionally or alternatively, operations may include additional features not mentioned below, or further processes may be added.

At 405, a command is received from a host system. The command may be an example of an access command (e.g., a write command or a read command). That is, the command may be associated with accessing one or more memory devices of the memory system.

At 410, the command is added to a command queue. The command queue may include a set of commands to be executed (or being executed) by the memory system. The quantity of commands in the command queue may be referred to as the queue depth. In some cases, the command queue may support storing a threshold (e.g., maximum) quantity of commands at a time, referred to as a threshold queue depth or a maximum queue depth. In some examples, the memory system may add the command to the command queue at a specific queue tag (e.g., an empty queue tag not currently storing a command).

At 415, a queue refill time for the command queue may be measured. Measuring the queue refill time may involve measuring a refill time for one or more queue tags of the command queue. An example of a refill time may be the time it takes for the memory system to add a second command (different from a first command) to the queue tag upon execution of the first command at the queue tag. In some examples, the memory system may use the fastest refill time of the one or more queue tags as the queue refill time. In some examples, the memory system may use an average of the refill times of the one or more queue tags as the queue refill time. In some examples, the memory system may store the refill times of the one or more queue tags and the queue refill time for the command queue at a memory device of the memory system. In some cases, the memory system may calculate a threshold performance based on (e.g., calculated using) the queue refill time. For example, the memory system may multiply the queue refill time by the amount by the queue depth and determine the performance of the memory system in terms of operations per second.

At 420, it may be determined whether a change in the queue refill time for the command queue satisfies a threshold. As described with reference to FIGS. 2 and 3, the queue refill time may be updated as conditions change by running one or more additional benchmark tests. The memory system may compare the queue refill time measured at 415 to a past queue refill time and may determine whether the difference between the measured queue refill time and the past queue refill time satisfies a threshold.

At 425, resources for the command queue are not adjusted (e.g., if the change in the queue refill time fails to satisfy a threshold for triggering an update to resource allocation).

At 430, resources for the command queue are adjusted according to the measured queue refill time. In some examples, the memory system may adjust processing resources for the command queue in response to the queue refill time. For example, the memory system may perform one or more tasks using at least a portion of the processing resources for the command queue, deactivate at least the portion of the processing resources for the command queue, or adjust a clock rate or voltage for a processor during a duration of the queue refill time. Additionally or alternatively, the memory system may adjust the queue depth (e.g., a threshold queue depth, such as a maximum queue depth) of the command queue in response to the queue refill time. In some examples, the memory system may adjust resources for command queue to support the adjusted queue depth. For example, the memory system may adjust a quantity of memory devices working in parallel or a quantity of processors working in parallel in response to the adjusted queue depth. Additionally or alternatively, the memory system may determine a type of read command for reading one or more of the memory devices or may adjust the quantity of memory resources allocated to a cache (e.g., an SRAM cache) in response to the adjusted queue depth.

Aspects of the process flow 400 may be implemented by a controller in a system (such as a system 100 or a system 200), among other components. For example, a memory system controller of a memory system may perform one or more aspects of the process flow 400. Additionally or alternatively, aspects of the process flow 400 may be implemented as instructions stored in memory (e.g., firmware stored in a memory coupled with a memory system). For example, the instructions, when executed by a controller (e.g., a memory system controller), may cause the controller to perform the operations of the process flow 400.

Figure 5:
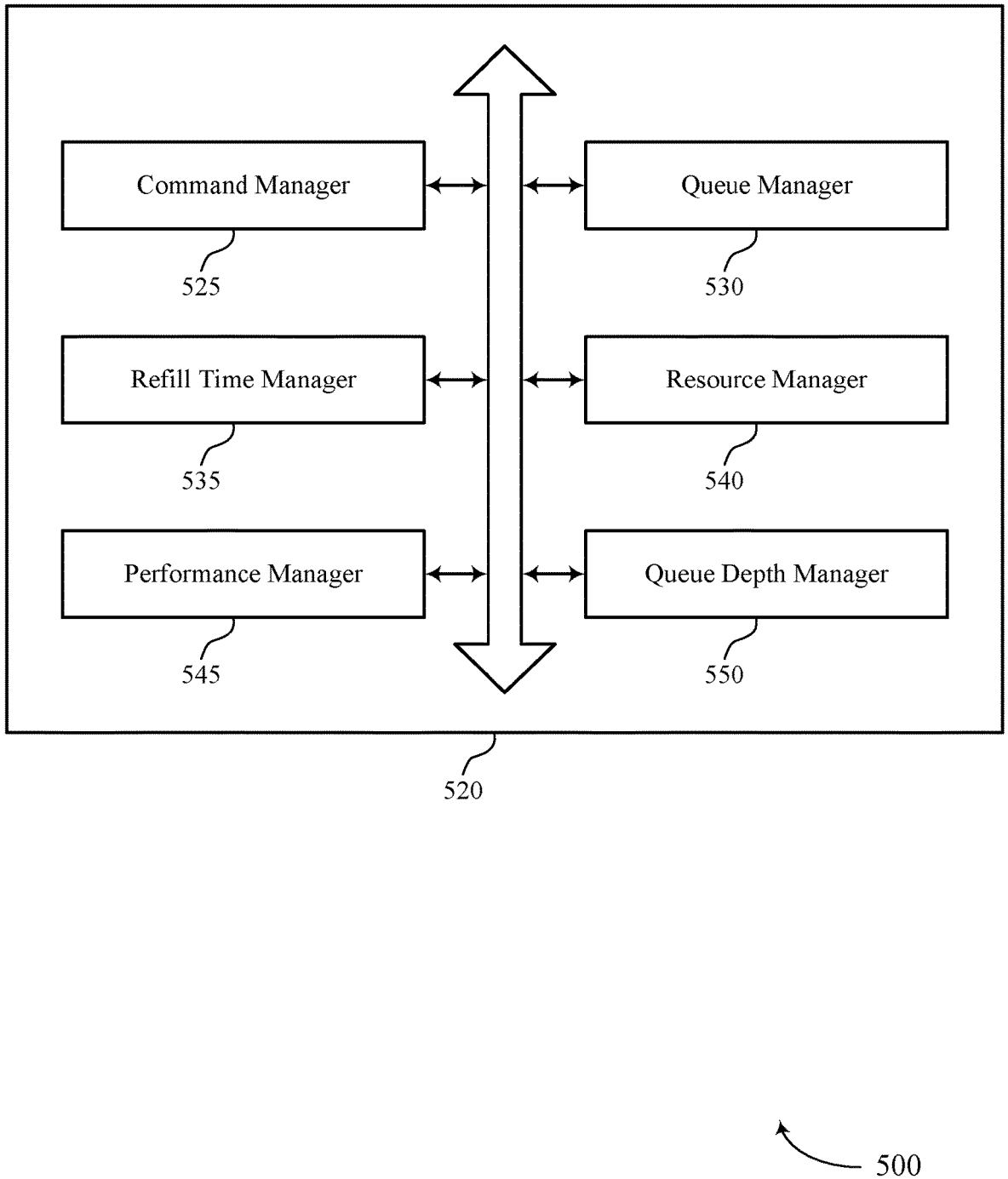
FIG. 5 shows a block diagram of a memory system that supports techniques for memory system configuration using a queue refill time in accordance with examples as disclosed herein.

FIG. 5 shows a block diagram 500 of a memory system 520 that supports techniques for memory system configuration using a queue refill time in accordance with examples as disclosed herein. The memory system 520 may be an example of aspects of a memory system as described with reference to FIGS. 1 through 4. The memory system 520, or various components thereof, may be an example of means for performing various aspects of techniques for memory system configuration using a queue refill time as described herein. For example, the memory system 520 may include a command manager 525, a queue manager 530, a refill time manager 535, a resource manager 540, a performance manager 545, a queue depth manager 550, or any combination thereof. Each of these components may communicate, directly or indirectly, with one another (e.g., via one or more buses).

The command manager 525 may be configured as or otherwise support a means for receiving a command from a host system. The queue manager 530 may be configured as or otherwise support a means for adding the command to a command queue, where the command queue includes a plurality of commands to be executed by a memory system, and where each of the plurality of commands corresponds to a respective queue tag of the command queue. The refill time manager 535 may be configured as or otherwise support a means for measuring a queue refill time for the command queue based at least in part on (e.g., using a measurement for) at least one queue tag of the command queue. The resource manager 540 may be configured as or otherwise support a means for adjusting at least one resource for the command queue based at least in part on (e.g., in response to) the queue refill time.

In some examples, to support adjusting the at least one resource for the command queue, the resource manager 540 may be configured as or otherwise support a means for performing one or more operations at the memory system using the at least one resource for the command queue during a duration associated with the queue refill time.

In some examples, to support adjusting the at least one resource for the command queue, the resource manager 540 may be configured as or otherwise support a means for deactivating the at least one resource for the command queue during a duration associated with the queue refill time.

In some examples, to support adjusting the at least one resource for the command queue, the resource manager 540 may be configured as or otherwise support a means for adjusting a clock rate for a processor during a duration associated with the queue refill time.

In some examples, to support adjusting the at least one resource for the command queue, the resource manager 540 may be configured as or otherwise support a means for adjusting a voltage for a processor during a duration associated with the queue refill time.

In some examples, to support adjusting the at least one resource for the command queue, the resource manager 540 may be configured as or otherwise support a means for adjusting a queue depth (e.g., a threshold queue depth, such as a maximum queue depth) of the command queue from a first quantity of queue tags to a second quantity of queue tags, the queue depth corresponding to a threshold quantity of commands supported by the command queue.

In some examples, the resource manager 540 may be configured as or otherwise support a means for adjusting a quantity of memory devices operating in parallel for the memory system, a quantity of processors operating in parallel for the memory system, or both based at least in part on (e.g., in response to) adjusting the queue depth.

In some examples, the resource manager 540 may be configured as or otherwise support a means for determining a type of read command to use for read operations by the memory system based at least in part on (e.g., in response to) adjusting the queue depth.

In some examples, the resource manager 540 may be configured as or otherwise support a means for adjusting a quantity of memory resources allocated to a cache based at least in part on (e.g., in response to) adjusting the queue depth.

In some examples, the resource manager 540 may be configured as or otherwise support a means for reallocating at least a portion of resources for the command queue associated with the first quantity of queue tags but not associated with the second quantity of queue tags based at least in part on (e.g., in response to) adjusting the queue depth. In some examples, the first quantity of queue tags is greater than the second quantity of queue tags.

In some examples, the queue depth manager 550 may be configured as or otherwise support a means for predicting a threshold queue depth based at least in part on (e.g., in response to) the queue refill time, where the queue depth of the command queue is adjusted to the predicted threshold queue depth.

In some examples, the command is added to the command queue at a first queue tag, and the command manager 525 may be configured as or otherwise support a means for executing the command. The queue manager 530 may be configured as or otherwise support a means for removing the command from the first queue tag of the command queue based at least in part on (e.g., in direct response to) executing the command. The command manager 525 may be configured as or otherwise support a means for receiving a second command from the host system, and the queue manager 530 may be configured as or otherwise support a means for adding the second command to the command queue at the first queue tag based at least in part on (e.g., due to) removing the command from the command queue, where the queue refill time is measured based at least in part on (e.g., using values associated with) removing the command from the first queue tag and adding the second command to the command queue at the first queue tag.

In some examples, the refill time manager 535 may be configured as or otherwise support a means for storing, with a first association to the first queue tag, a first timestamp indicating a first time at which the command is removed from the first queue tag of the command queue. In some examples, the refill time manager 535 may be configured as or otherwise support a means for storing, with a second association to the first queue tag, a second timestamp indicating a second time at which the second command is added to the command queue at the first queue tag. In some examples, the refill time manager 535 may be configured as or otherwise support a means for calculating a difference between the second timestamp and the first timestamp to determine the queue refill time.

In some examples, to support measuring the queue refill time, the refill time manager 535 may be configured as or otherwise support a means for measuring a plurality of refill times for a plurality of queue tags of the command queue. In some examples, to support measuring the queue refill time, the refill time manager 535 may be configured as or otherwise support a means for averaging the plurality of refill times to determine the queue refill time.

In some examples, the refill time manager 535 may be configured as or otherwise support a means for storing the queue refill time at a memory device of the memory system, the controller of the memory system, the command queue, or a combination thereof.

In some examples, the refill time manager 535 may be configured as or otherwise support a means for adjusting the queue refill time for the command queue based at least in part on (e.g., in response to) executing one or more additional commands.

In some examples, the performance manager 545 may be configured as or otherwise support a means for calculating a threshold performance of the memory system based at least in part on (e.g., according to) the queue refill time, where the at least one resource is adjusted based at least in part on (e.g., in response to) the threshold performance.

Figure 6:
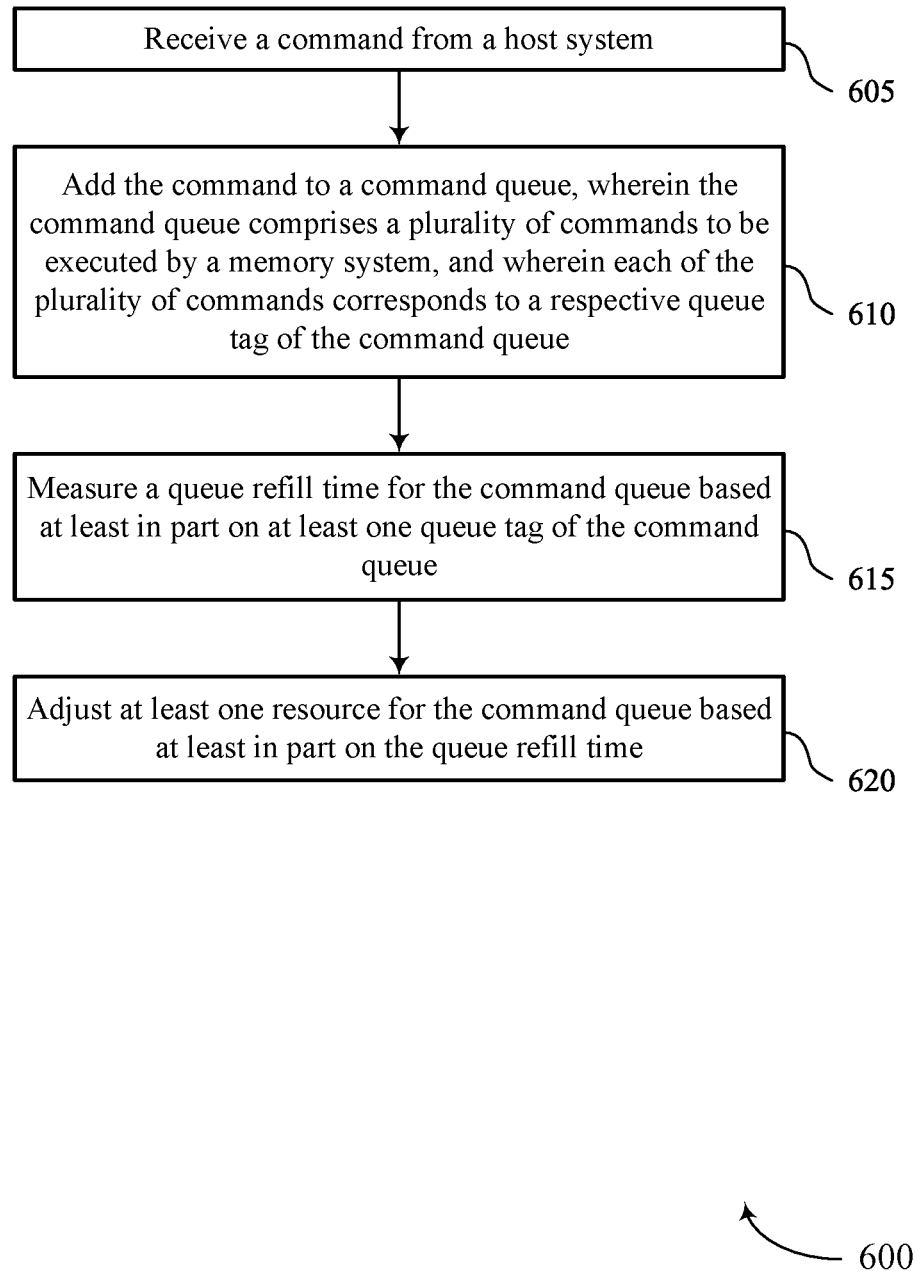
FIG. 6 shows a flowchart illustrating a method or methods that support techniques for memory system configuration using a queue refill time in accordance with examples as disclosed herein.

FIG. 6 shows a flowchart illustrating a method 600 that supports techniques for memory system configuration using a queue refill time in accordance with examples as disclosed herein. The operations of method 600 may be implemented by a memory system or its components as described herein. For example, the operations of method 600 may be performed by a memory system as described with reference to FIGS. 1 through 5. In some examples, a memory system may execute a set of instructions to control the functional elements of the device to perform the described functions. Additionally or alternatively, the memory system may perform aspects of the described functions using special-purpose hardware.

At 605, the method may include receiving a command from a host system. The operations of 605 may be performed in accordance with examples as disclosed herein. In some examples, aspects of the operations of 605 may be performed by a command manager 525 as described with reference to FIG. 5.

At 610, the method may include adding the command to a command queue, where the command queue includes a plurality of commands to be executed by a memory system, and where each of the plurality of commands corresponds to a respective queue tag of the command queue. The operations of 610 may be performed in accordance with examples as disclosed herein. In some examples, aspects of the operations of 610 may be performed by a queue manager 530 as described with reference to FIG. 5.

At 615, the method may include measuring a queue refill time for the command queue based at least in part on (e.g., using one or more values associated with) at least one queue tag of the command queue. The operations of 615 may be performed in accordance with examples as disclosed herein.

In some examples, aspects of the operations of 615 may be performed by a refill time manager 535 as described with reference to FIG. 5.

At 620, the method may include adjusting at least one resource for the command queue based at least in part on (e.g., in response to) the queue refill time. The operations of 620 may be performed in accordance with examples as disclosed herein. In some examples, aspects of the operations of 620 may be performed by a resource manager 540 as described with reference to FIG. 5.

In some examples, an apparatus as described herein may perform a method or methods, such as the method 600. The apparatus may include, features, circuitry, logic, means, or instructions (e.g., a non-transitory computer-readable medium storing instructions executable by a processor) for receiving a command from a host system, adding the command to a command queue, where the command queue includes a plurality of commands to be executed by a memory system, and where each of the plurality of commands corresponds to a respective queue tag of the command queue, measuring a queue refill time for the command queue based at least in part on at least one queue tag of the command queue, and adjusting at least one resource for the command queue based at least in part on the queue refill time.

In some examples of the method 600 and the apparatus described herein, adjusting the at least one resource for the command queue may include operations, features, circuitry, logic, means, or instructions for performing one or more operations at the memory system using the at least one resource for the command queue during a duration associated with the queue refill time.

In some examples of the method 600 and the apparatus described herein, adjusting the at least one resource for the command queue may include operations, features, circuitry, logic, means, or instructions for deactivating the at least one resource for the command queue during a duration associated with the queue refill time.

In some examples of the method 600 and the apparatus described herein, adjusting the at least one resource for the command queue may include operations, features, circuitry, logic, means, or instructions for adjusting a clock rate for a processor during a duration associated with the queue refill time.

In some examples of the method 600 and the apparatus described herein, adjusting the at least one resource for the command queue may include operations, features, circuitry, logic, means, or instructions for adjusting a voltage for a processor during a duration associated with the queue refill time.

In some examples of the method 600 and the apparatus described herein, adjusting the at least one resource for the command queue may include operations, features, circuitry, logic, means, or instructions for adjusting a queue depth of the command queue from a first quantity of queue tags to a second quantity of queue tags, the queue depth corresponding to a threshold quantity of commands supported by the command queue.

Some examples of the method 600 and the apparatus described herein may further include operations, features, circuitry, logic, means, or instructions for adjusting a quantity of memory devices operating in parallel for the memory system, a quantity of processors operating in parallel for the memory system, or both based at least in part on adjusting the queue depth.

Some examples of the method 600 and the apparatus described herein may further include operations, features, circuitry, logic, means, or instructions for determining a type of read command to use for read operations by the memory system based at least in part on adjusting the queue depth.

Some examples of the method 600 and the apparatus described herein may further include operations, features, circuitry, logic, means, or instructions for adjusting a quantity of memory resources allocated to a cache based at least in part on adjusting the queue depth.

Some examples of the method 600 and the apparatus described herein may further include operations, features, circuitry, logic, means, or instructions for reallocating at least a portion of resources for the command queue associated with the first quantity of queue tags but not associated with the second quantity of queue tags based at least in part on adjusting the queue depth.

In some examples of the method 600 and the apparatus described herein, the first quantity of queue tags may be greater than the second quantity of queue tags.

Some examples of the method 600 and the apparatus described herein may further include operations, features, circuitry, logic, means, or instructions for predicting a threshold queue depth based at least in part on the queue refill time, where the queue depth of the command queue may be adjusted to the predicted threshold queue depth.

In some examples of the method 600 and the apparatus described herein, the command may be added to the command queue at a first queue tag and the method, apparatuses, and non-transitory computer-readable medium may include further operations, features, circuitry, logic, means, or instructions for executing the command, removing the command from the first queue tag of the command queue based at least in part on executing the command, receiving a second command from the host system, and adding the second command to the command queue at the first queue tag based at least in part on removing the command from the command queue, where the queue refill time may be measured based at least in part on removing the command from the first queue tag and adding the second command to the command queue at the first queue tag.

Some examples of the method 600 and the apparatus described herein may further include operations, features, circuitry, logic, means, or instructions for storing, with a first association to the first queue tag, a first timestamp indicating a first time at which the command may be removed from the first queue tag of the command queue, storing, with a second association to the first queue tag, a second timestamp indicating a second time at which the second command may be added to the command queue at the first queue tag, and calculating a difference between the second timestamp and the first timestamp to determine the queue refill time.

In some examples of the method 600 and the apparatus described herein, measuring the queue refill time may include operations, features, circuitry, logic, means, or instructions for measuring a plurality of refill times for a plurality of queue tags of the command queue and averaging the plurality of refill times to determine the queue refill time.

Some examples of the method 600 and the apparatus described herein may further include operations, features, circuitry, logic, means, or instructions for storing the queue refill time at a memory device of the memory system, the controller of the memory system, the command queue, or a combination thereof.

Some examples of the method 600 and the apparatus described herein may further include operations, features, circuitry, logic, means, or instructions for adjusting the queue refill time for the command queue based at least in part on executing one or more additional commands.

Some examples of the method 600 and the apparatus described herein may further include operations, features, circuitry, logic, means, or instructions for calculating a threshold performance of the memory system based at least in part on the queue refill time, where the at least one resource may be adjusted based at least in part on the threshold performance.

It should be noted that the methods described above describe possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally or alternatively (e.g., in an alternative example) be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or technologies such as infrared, radio, and microwave, then the coaxial cable, fiber optic cable, twisted pair, DSL, or technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:
   a memory device; and
   a controller coupled with the memory device and configured to cause the apparatus to:
   receive a first command from a host system;
   add the first command to a command queue, wherein the command queue comprises a plurality of commands to be executed by a memory system and a plurality of queue tags, and wherein each of the plurality of commands corresponds to a respective queue tag of the command queue;
   measure a queue refill time for the command queue based at least in part on a first queue tag of the plurality of queue tags of the command queue, the queue refill time corresponding to a time difference between a removal of the first command from the command queue at the first queue tag and a second command subsequent to the first command being added to the command queue at the first queue tag; and
   adjust at least one resource for the command queue based at least in part on the queue refill time.

2. The apparatus of claim 1, wherein, to adjust the at least one resource for the command queue, the controller is configured to cause the apparatus to:
   perform one or more operations at the memory system using the at least one resource for the command queue during a duration associated with the queue refill time.

3. The apparatus of claim 1, wherein, to adjust the at least one resource for the command queue, the controller is configured to cause the apparatus to:
   deactivate the at least one resource for the command queue during a duration associated with the queue refill time.

4. The apparatus of claim 1, wherein, to adjust the at least one resource for the command queue, the controller is configured to cause the apparatus to:
   adjust a clock rate for a processor during a duration associated with the queue refill time.

5. The apparatus of claim 1, wherein, to adjust the at least one resource for the command queue, the controller is configured to cause the apparatus to:
   adjust a voltage for a processor during a duration associated with the queue refill time.

6. The apparatus of claim 1, wherein, to adjust the at least one resource for the command queue, the controller is configured to cause the apparatus to:
   adjust a queue depth of the command queue from a first quantity of queue tags to a second quantity of queue tags, the queue depth corresponding to a maximum quantity of commands supported by the command queue.

7. The apparatus of claim 6, wherein the controller is further configured to cause the apparatus to:
   adjust a quantity of memory devices operating in parallel for the memory system, a quantity of processors operating in parallel for the memory system, or both based at least in part on adjusting the queue depth.

8. The apparatus of claim 6, wherein the controller is further configured to cause the apparatus to:
   determine a type of read command to use for read operations by the memory system based at least in part on adjusting the queue depth.

9. The apparatus of claim 6, wherein the controller is further configured to cause the apparatus to:
   adjust a quantity of memory resources allocated to a cache based at least in part on adjusting the queue depth.

10. The apparatus of claim 6, wherein the controller is further configured to cause the apparatus to:
    reallocate at least a portion of resources for the command queue associated with the first quantity of queue tags but not associated with the second quantity of queue tags based at least in part on adjusting the queue depth.

11. The apparatus of claim 6, wherein the first quantity of queue tags is greater than the second quantity of queue tags.

12. The apparatus of claim 6, wherein the controller is further configured to cause the apparatus to:
    predict a threshold queue depth based at least in part on the queue refill time, wherein the queue depth of the command queue is adjusted to the predicted threshold queue depth.

13. The apparatus of claim 1, wherein the controller is further configured to cause the apparatus to:
    execute the first command;
    remove the first command from the first queue tag of the command queue based at least in part on executing the first command;
    receive the second command from the host system; and
    add the second command to the command queue at the first queue tag based at least in part on removing the first command from the command queue, wherein the queue refill time is measured based at least in part on removing the first command from the first queue tag and adding the second command to the command queue at the first queue tag.

14. The apparatus of claim 13, wherein the controller is further configured to cause the apparatus to:

store, with a first association to the first queue tag, a first timestamp indicating a first time at which the first command is removed from the first queue tag of the command queue;

store, with a second association to the first queue tag, a second timestamp indicating a second time at which the second command is added to the command queue at the first queue tag; and calculate a difference between the second timestamp and the first timestamp to determine the queue refill time.

15. The apparatus of claim 1, wherein, to measure the queue refill time, the controller is configured to cause the apparatus to:

measure a plurality of refill times for the plurality of queue tags of the command queue; and average the plurality of refill times to determine the queue refill time.

16. The apparatus of claim 1, wherein the controller is further configured to cause the apparatus to:

store the queue refill time at the memory device of the memory system, the controller of the memory system, the command queue, or a combination thereof.

17. The apparatus of claim 1, wherein the controller is further configured to cause the apparatus to:

adjust the queue refill time for the command queue based at least in part on executing one or more additional commands.

18. The apparatus of claim 1, wherein the controller is further configured to cause the apparatus to:

calculate a threshold performance of the memory system based at least in part on the queue refill time, wherein the at least one resource is adjusted based at least in part on the threshold performance.

19. A non-transitory computer-readable medium storing code comprising instructions which, when executed by a processor of an electronic device, cause the electronic device to:

receive a first command from a host system;

add the first command to a command queue, wherein the command queue comprises a plurality of commands to be executed by a memory system and a plurality of queue tags, and wherein each of the plurality of commands corresponds to a respective queue tag of the command queue;

measure a queue refill time for the command queue based at least in part on a first queue tag of the plurality of queue tags of the command queue, the queue refill time corresponding to a time difference between a removal of the first command from the command queue at the first queue tag and a second command subsequent to the first command being added to the command queue at the first queue tag; and adjust at least one resource for the command queue based at least in part on the queue refill time.

20. A method performed by a memory system, the method comprising:

receiving a first command from a host system;

adding the first command to a command queue, wherein the command queue comprises a plurality of commands to be executed by the memory system and a plurality of queue tags, and wherein each of the plurality of commands corresponds to a respective queue tag of the command queue;

measuring a queue refill time for the command queue based at least in part on a first queue tag of the plurality of queue tags of the command queue, the queue refill time corresponding to a time difference between a removal of the first command from the command queue at the first queue tag and a second command subsequent to the first command being added to the command queue at the first queue tag; and adjusting at least one resource for the command queue based at least in part on the queue refill time.

* * * * *